UNITED STATES PATENT OFFICE.

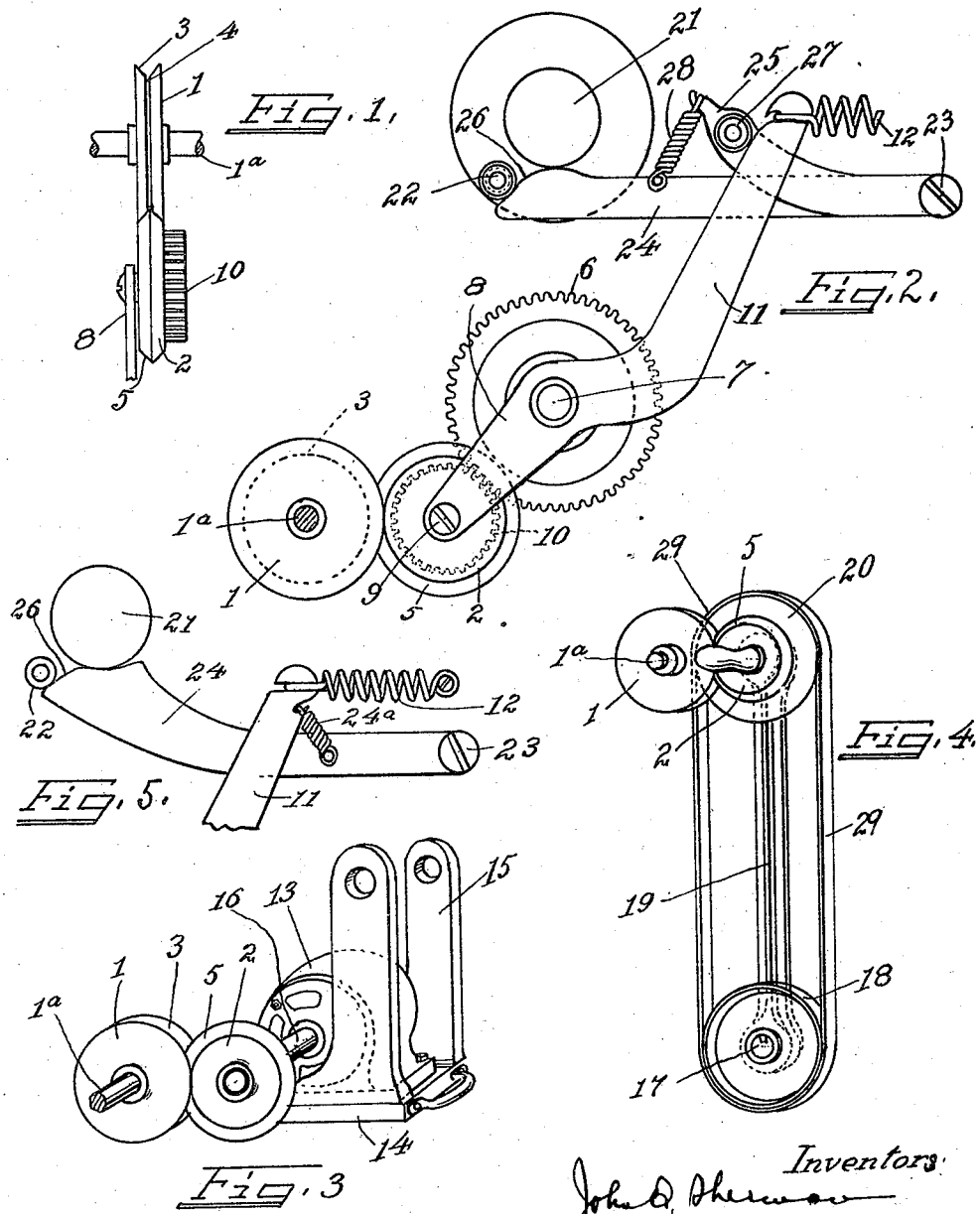

JOHN Q. SHERMAN AND ALBERT W. METZNER, OF DAYTON, OHIO; SAID METZNER ASSIGNOR TO SAID SHERMAN.

TRANSMISSION MECHANISM.

1,419,174. Specification of Letters Patent. Patented June 13, 1922.

Application filed November 12, 1919. Serial No. 337,472.

*To all whom it may concern:*

Be it known that we, JOHN Q. SHERMAN and ALBERT W. METZNER, citizens of the United States, and residents of the city of Dayton, in the county of Montgomery and State of Ohio, have invented certain new and useful Improvements in Transmission Mechanisms, of which the following is a full, clear, and exact description, reference being had to the drawings forming a part of this specification.

Our invention relates to transmission mechanisms and more particularly to a friction transmission of power.

It is our object to provide a friction transmission which embodies interacting friction wheels having corresponding beveled and grooved peripheries, one of said wheels frictionally pressed against the other. Such wheels have among other things, a self ground seat for the transmission of power, and the shape of said wheels permits of considerable wear without losing their full contact area.

We have found this frictional transmission to be of great value in connection with the accurate feeding of films of paper which illustrates its value for positive operation, when necessary, and a freedom to slip under strain, so as not to tear a piece of paper being fed by it.

These objects and other advantages, we accomplish by that certain construction and arrangement of parts, to be hereinafter more specifically pointed out and claimed.

In the drawings,

Figure 1 is an edge-wise elevation of the friction wheels.

Figure 2 is a side elevation illustrating our method of use of the invention.

Figure 3 is a perspective view illustrating partially diagrammatically another form of use.

Figure 4 is a partially diagrammatic view illustrating a third method of use.

Figure 5 is a side elevation showing a modification which is simpler than that of Figure 2.

1 is a driven wheel and 2 a driving wheel in the various modifications, although the driving relation of the wheels could be reversed without departing at all from the spirit of our invention, so that in referring to driving and driven wheels we are using the term merely for the purpose of convenience.

The driven wheel is formed with a V-shaped groove 3 at its periphery and at the base of the groove, there is preferably formed a channel 4 and wheel 1 is, in each instance, shown as mounted on the work shaft 1ª.

The driving wheel 2 is provided at its periphery with a bevel 5 which matches the groove 3 of the driven wheel. When the two wheels are pressed together, and one of them is revolved, it will frictionally impart revolution to the other in the opposite direction and it may be observed that the direction of motion of the peripheries of the two wheels is such that there is always a slight rubbing or grinding action. This self grinding feature not only keeps the co-acting surfaces clean but insures a perfect fit of one into the other. The channel at the base of the groove 3 protects the edge of the bevel 5 and thus allows for considerable wear of the parts. It is also evident that the arrangement of co-acting bevel and groove provides for a comparatively wide line of contact as compared with the actual width of the wheels.

The precise method of use of the above described friction transmission wheels is not essential to our invention. We have shown, partially diagrammatically, three different forms of device which are applicable.

In the device shown in Figure 2, there is an actuated gear wheel 6 on a shaft 7, which shaft also serves as a pivot for a lever or hanger 8. The friction wheel 2 is carried on one end of the lever 8 on a pivot 9, and has mounted on its face, a pinion 10. This pinion will be in mesh with the gear 6 at any position of the lever 8. The upper end 11 of the lever is provided with a spring 12, to maintain a frictional contact of the wheel 2 with the wheel 1.

This form of device has been employed by us in the feeding of paper in an autographic register with great success. We have found that the positiveness of the feed is assisted if springs are not relied upon entirely to make the initial grasp of the surfaces, but instead some mechanical means are used to force the surfaces together, after which the resiliency is relied upon to maintain it, and preserve the driving contact until the strain may cause a slippage. Should a positive and immediate pick-up not be desired, the additional mechanism to be described may be dispensed with. The simplest form of mechanism for the purpose is shown in Figure 5.

On what would be some operated shaft 21 connected operatively to the gear 6 such as the paper feed shaft of an autographic register we mount a stud 22, which revolves therewith. On a pivot 23, is mounted a device comprising an arm 24, which has a nose 26 resting on the operating member 21, said nose lying in the path of the stud 22 so that once in every revolution of the member 21, it will be depressed.

A small spring 24$^a$ connects the arm 24 with the lever 11 which carries the one friction wheel, and the parts are arranged so that upon the beginning of each complete rotation of whatever machine is being employed the friction wheel 2 will be forcibly moved with substantially less yieldability than normal, into a driving contact with the friction wheel 3. In autographic registers or other form issuing machines one revolution ordinarily completes each operation and it is in such machines that our improvement has greatest advantage.

A more complicated and hence less economical mechanism is shown in Figure 2 wherein the arm 24, with its nose is present but instead of the spring 24$^a$ being employed, an arm 25 is connected on the shaft 23, which arm carries a roller 27. The roller bears against the side of the lever 11, and the end of the arm is connected by a spring 28 with the arm 24.

This mechanism serves to impart perhaps a more powerful thrust to the lever 11, and lies more thoroughly out of the way during the normal movement of the parts, but we prefer the former construction, particularly from the point of view of simplicity due to the fact that it will not get out of order or become caught or clogged as a result thereof.

The above mechanism, or its essentials could well be applied to some other sort of friction drive aside from the V-shaped groove drive above described.

In Figure 3 is shown a motor 13 mounted on a base 14 that is swung from suitable standards 15. The shaft 16 of the motor is shown as having the friction wheel 2 and by swinging the entire motor support, the wheel 2 may be brought up against the wheel 1 and held in that position by hand or in such other manner as may be desired.

In Figure 4 is shown a construction wherein the shaft 17 is the source of power and carries the pulley 18. Loosely mounted on the shaft is a bracket arm 19 that journals, at its other end, a pulley 20. A belt 29 passes over this pulley, and secured to the pulley 20 is the friction wheel 2. The operator may bring the wheel 2 up against the wheel 1, by manipulating the handle 29$^a$ that is secured to the bracket arm 19.

The two friction wheels are preferably made of metal or some equally rigid material, although this is not absolutely essential. It is also preferred that the groove and bevel of the wheel peripheries shall match with substantial accuracy.

Having thus described our invention, what we claim as new and desire to secure by Letters Patent is:—

1. A transmission mechanism comprising essentially a pair of friction wheels, one of same being relatively movable to the other, said wheels having their peripheries adapted to contact with each other, said peripheries being shaped, for the one wheel as a V-shaped groove and for the other wheel as a V-shaped bevel, means for yieldably maintaining contact of the said wheels, and means for momentarily enforcing a positive contact thereof at the inception of each operation.

2. A transmission mechanism comprising essentially a pair of rotary friction elements, mechanism for driving one of said elements, a member for carrying one of said elements and adapted to yieldably press it against the other wheel, and means under control of the driving mechanism for imparting additional force to said carrying member, at the desired point in the movement of said mechanism.

3. A transmission mechanism comprising essentially a pair of friction wheels, mechanism for driving one of said wheels, an arm carrying one of said wheels, and spring controlled to yieldably press it against the other wheel, another arm spring-connected to the carrying arm, and means under control of the driving mechanism for actuating the other arm to give additional force to the spring controlled arm, at the inception of feeding operations.

4. A transmission mechanism comprising essentially a pair of friction wheels one of them being relatively movable with relation to the other, and adapted to yieldably contact with each other, means for driving one of said wheels, and means for moving one of said wheels into a positive driving contact with the other at the inception of the movement of the driving means and then releasing it for yieldable contact only.

5. A transmission mechanism comprising, in combination with an operating device, a pair of friction wheels, and mounting means therefor, one of them being relatively movable with relation to the other and said wheels adapted to contact with each other, spring means for normally maintaining said contact, and means connected to the operating device for forcibly moving the relatively movable wheel into driving contact at the selected period of operation and then releasing it during the balance of the operation.

6. A transmission mechanism comprising, in combination with an operating device, a pair of friction wheels, and mounting means therefor, one of them being relatively movable with relation to the other and said wheels adapted to contact with each other, spring means for normally maintaining said contact, and means connected to the operating device for forcibly moving the relatively movable wheel into driving contact at the selected period of operation and then releasing it during the balance of the operation, comprising an eccentric and a member controlled by said eccentric, with means on the said member to contact with the mounting means for the relatively movable wheel

JOHN Q. SHERMAN.
ALBERT W. METZNER.